Patented Jan. 1, 1935

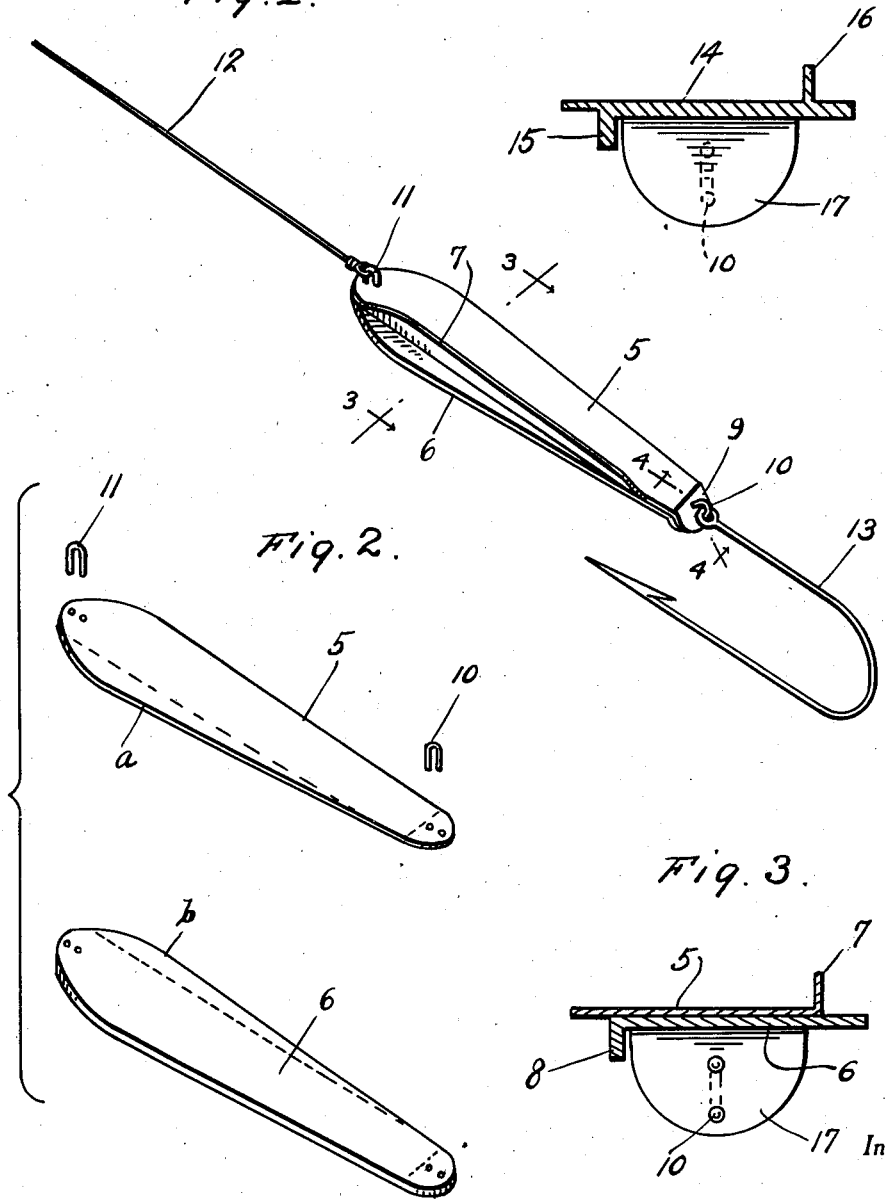

1,986,282

UNITED STATES PATENT OFFICE 1,986,282

FISHING SPOON

Harry Lee Parker, Puente, Calif.

Application December 4, 1933, Serial No. 700,886

3 Claims. (Cl. 43—42)

This invention appertains to new and useful improvements in fishing equipment, and more particularly to a fishing spoon or drone for use in trolling.

The principal object of the present invention is to provide a spoon of the character stated which is constructed in such a manner as to effectively guide a fish biting the spoon proper toward the hook carried by the spoon.

Another important object of the invention is to provide a spoon or drone constructed in such a manner as to cause a transverse rocking motion as it is pulled through the water.

Still another important object of the invention is to provide a fishing device of the character mentioned constructed in such a manner as to cause a darting motion when pulled through the water.

These and various other important objects and advantages of the invention will become apparent as the invention is better understood from the following specification.

In the drawing:—

Figure 1 represents a perspective view of the spoon in its entirety.

Figure 2 represents perspective views of the two sections of the spoon and the securing elements therefor.

Figure 3 represents a transverse sectional view taken substantially on line 3—3 of Figure 1.

Figure 4 represents a fragmentary longitudinal sectional view taken substantially on line 4—4 of Figure 1.

Figure 5 represents a transverse sectional view through a slightly modified form of the invention.

Referring to the drawing wherein like numerals designate like parts, it can be seen in Figures 1 to 4, inclusive, that this form of the invention involves a pair of elongated plates 5—6, each tapering gradually toward its rear end and each having its ends rounded off in the manner shown. The plate 5 is substantially thinner than the plate 6 so as to have the plate 5 substantially lighter than the plate 6. The portions a and b of these plates 5—6, respectively, are bent upwardly and dodwnwardly so as to provide ribs 7—8 on these plates 5—6. The rear end portions of these plates 5—6 are bent downwardly to an inclined position to provide a tail piece 9. U-shaped eye members 10 and 11 at the tail piece and forward end portions of the spoon have their leg portions engaged through the plates and are headed and otherwise deformed to firmly secure the plates 5—6 together. The fishing line 12 is attached to the forward eye 12, while the usual drag hook 13 is connected to the rear eye 10.

A slightly modified form of the invention is shown in Figure 5, wherein the body of the spoon, denoted by numeral 14, is of one-piece construction, the same having a rather thick rib 15 depending from the bottom side thereof and running longitudinally of the plate 14 slightly inwardly from one edge portion thereof, while at the top is an upstanding relatively thin rib 16 extending longitudinally of the plate 14 and slightly inwardly from the opposite edge of the plate. This plate 14 also has a depending tail piece or rudder 17.

By having the rib 8 (or the rib 15 in the modification Figure 5) heavier than the rib 7, (or the rib 16), the spoon is overbalanced at one side so that as it travels through the water it will have a tendency to rock laterally. The tail piece 9 (or the tail piece 17 in the modification) serves as a rudder and will cause the spoon to dart in a more or less zig-zag course through the water.

In regard to the ribs 7—8 (or the ribs 15—16 in the modification), it will be observed that when a fish, especially game fish having teeth, strikes the spoon, the fish will be guided by his teeth engaging the ribs, along the spoon until his head strikes the hook 13 and the fish is hooked.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A fishing device comprising a spoon, a hook at the tail end portion of the spoon, one longitudinal edge portion of the spoon being increased in thickness to make the same substantially heavier than the other longitudinal edge portion thereof so as to cause a rocking motion of the spoon in its travel through the water.

2. A fishing device of the character described comprising a spoon, said spoon being constructed of a pair of plate sections secured against each other, a hook at one end of the spoon, each of the said sections having one longitudinal portion bent laterally to provide a rib, said ribs being located at opposite longitudinal edge portions of the spoon.

3. A fishing device comprising a spoon having a hook connected thereto and a rib extending laterally from each longitudinal edge portion of the spoon, one of the said ribs being substantially heavier than the other.

HARRY LEE PARKER.